(12) United States Patent
Ehrenberger et al.

(10) Patent No.: US 6,325,436 B1
(45) Date of Patent: Dec. 4, 2001

(54) CARGO AREA DIVIDER FOR A MOTOR VEHICLE

(75) Inventors: Marina Ehrenberger, Esslingen; Holger Seel, Aidlingen, both of (DE)

(73) Assignee: BOS GmbH & Co. KG, Aichwald (DE)

( * ) Notice: Subject to any disclaimer, the term of this patent is extended or adjusted under 35 U.S.C. 154(b) by 0 days.

(21) Appl. No.: 09/609,365

(22) Filed: Jul. 3, 2000

(30) Foreign Application Priority Data

Jul. 1, 1999 (DE) .............................................. 199 30 107

(51) Int. Cl.[7] ................................................... B60R 21/06
(52) U.S. Cl. ...................... 296/24.1; 296/37.16; 280/749
(58) Field of Search ................. 296/24.1, 37.16; 280/749

(56) References Cited

U.S. PATENT DOCUMENTS

| | | | |
|---|---|---|---|
| 5,437,474 | * | 8/1995 | Ament ................................. 280/749 |
| 5,551,726 | * | 9/1996 | Ament ............................. 296/24.1 X |
| 5,695,217 | * | 12/1997 | Ament et al. ........................ 280/749 |
| 5,820,187 | * | 10/1998 | Ament et al. ....................... 296/24.1 |
| 6,099,222 | * | 8/2000 | Moore ............................... 296/37.16 |
| 6,183,028 | * | 2/2001 | Ament et al. ....................... 296/24.1 |

* cited by examiner

Primary Examiner—Joseph D. Pape
Assistant Examiner—Jason Morrow
(74) Attorney, Agent, or Firm—Crowell & Moring LLP

(57) ABSTRACT

A cargo area divider for a motor vehicle has a flexible planar structure that is equipped in a front end region with a pull-out profile that has retaining elements for detachably securing the pull-out profile on vehicle-mounted retainers in a roof region of the motor vehicle. When the planar structure is in the pulled-out functional state, the retaining elements project upward beyond an upper edge of the pull-out profile; and the corresponding vehicle-mounted retainers are positioned, in order to receive the retaining elements, in a horizontal headliner region at a distance from lateral roof frame elements of the roof region of the motor vehicle.

17 Claims, 7 Drawing Sheets

CARGO AREA DIVIDER FOR A MOTOR VEHICLE

BACKGROUND AND SUMMARY OF INVENTION

This application claims the priority of German patent document 199 30 107.7, filed Jul. 1, 1999.

The present invention relates to a cargo area divider for a motor vehicle, having at least one flexible planar structure, arranged so it can wind onto and off from a roller-shade shaft mounted in a vehicle-fixed bearing, that is equipped in a front end region with a dimensionally stable pull-out profile, extending over the entire width of the planar structure, that has retaining elements for detachably securing the pull-out profile, on vehicle-mounted retainers in a roof region of the motor vehicle when the planar structure is in the pulled-out functional state.

A cargo area divider of this kind is commonly known in station wagons. A cargo area divider of this kind has a flexible planar structure in the form of a divider net that is arranged so it can wind onto and off from a roller-shade shaft. The roller-shade shaft is mounted vehicle-fixed through a bearing. The roller-shade shaft is preferably integrated into a cassette housing, positioned immovably on the vehicle, extending in the transverse direction of the vehicle, that is equipped in the region of its upper side with a longitudinal slot, for passage of the divider net. Provided at the front end region of the divider net is a pull-out profile that is equipped at each of its two opposite sides with a retaining element in the form of a hooking knob. Associated with the hooking knobs as vehicle-mounted retainers are corresponding receptacles in the roof region, specifically each laterally at the level of the lateral roof frame elements. When the pull-out profile and the divider net are pulled up so the divider net is in its functional state, the retaining elements of the pull-out profile are hooked into the lateral vehicle-mounted retainers once the pulled-out functional state has been achieved.

It is also known, in the case of the "5-series touring" station wagon model BMW, to position next to one another two divider nets which are arranged in a common cassette housing on roller-shade shafts rotatably mounted independently of one another. The one divider net is equipped with a pull-out profile, capable of being pulled out, that in the pulled-out state extends over the entire width of the motor vehicle and also can be hooked by way of corresponding retaining elements into lateral roof-frame-mounted retainers. The second divider net is hooked, if necessary, into the pull-out profile of the first divider net.

It is an object of the invention to create a cargo area divider of the kind cited initially that has a retainer which is simplified by comparison with the existing art while at the same time creating the possibility for positioning at least two flexible planar structures arranged next to one another in the transverse direction of the vehicle.

This object is achieved in that when the planar structure is in the pulled-out functional state, the retaining elements project upward beyond an upper edge of the pull-out profile; and that the corresponding vehicle-mounted retainers are positioned, in order to receive the retaining elements, in a horizontal headliner region at a distance from lateral roof frame elements of the roof region of the motor vehicle. According to the invention, the retaining elements no longer project—as in the existing art—laterally out beyond the contour of the pull-out profile, but rather project upward from the pull-out profile. The retaining elements can be arranged both rigidly and movably in the pull-out profile, so that they either project upward from the pull-out profile both in the rest position and when the planar structure is in the functional state, or are moved into the functional position only when the planar structure is transferred into the pulled-out functional state of the planar structure. Because of the arrangement of the corresponding vehicle-mounted retainers in the horizontal headliner region at a distance from the lateral roof frame elements of the vehicle body, it is possible to arrange the vehicle-mounted retainer in a manner distributed over the width of the headliner region. As a result, it is also possible for two or more planar structures, arranged next to one another, each to be hooked up in the roof region independently of one another. A pull-out profile that can be elongated transversely, such as is provided in the existing art for retaining two divider nets, is therefore no longer necessary.

In an embodiment of the invention, the retaining elements are mounted on the pull-out profile movably between a rest position recessed into the pull-out profile and an elevated functional position projecting upward from the pull-out profile. In the rest position, the retaining elements are therefore integrated invisibly into the pull-out profile for a visually uniform impression. In addition to the visually appealing overall appearance of the cargo area divider when the retaining elements are in the rest position, the risk of injury that might occur if the retaining elements projected upward in the rest position is also reduced. The retaining elements either can be transferred manually into the rest position or functional position as necessary, or they can be automatically transferred into the rest position or functional position along with the corresponding pull-out or pull-in motion of the pull-out profile. The movable mounting also encompasses all suitable types of motion, in particular linear or pivoting motion.

In certain preferred embodiments of the invention, there is associated with the retaining elements a positive guidance device that has, at the level of the pulled-in stored position of the pull-out profile, positive guidance elements positioned immovably on the vehicle that force each retaining element into its recessed rest position as the stored position of the pull-out profile is reached, and release them for movement into the functional position as the pull-out profile is pulled out. As a result of the positive guidance of the retaining elements, they are positively transferred into the functional position as the pull-out profile is pulled out, and as the pull-out profile is pulled back into the stored position they are, conversely, positively brought back into their recessed rest position.

In certain preferred embodiments of the invention, each retaining element is spring-loaded in the direction of its functional position. This results in extremely simple automatic transfer of the retaining element into the functional position.

In certain preferred embodiments of the invention, each retaining element is mounted in pivotably movable fashion and has a guide contour that coacts with a stop, positioned immovably on the vehicle, in the region of the stored position of the pull-out profile. The stop and the guide contour are part of the positive guidance device that effects automatic transfer of the respective retaining element into the rest position or functional position, depending on the corresponding pull-out or pull-in motion of the pull-out profile.

In certain preferred embodiments of the invention, each vehicle-mounted retainer has an insertion profile, conformingly securing the retaining elements, that is constricted in a key shape toward the front in the vehicle travel direction. The retaining elements can therefore, in their functional position when the pull-out profile is pulled up, be inserted from below into the insertion profile, and can be pushed into the insertion profile, toward the front in the vehicle travel direction, for conforming anchoring. If, when the planar structure is in the pulled-out functional state, the pull-out profile is held automatically in this position by suitable support arrangements, the operation of manually pushing forward into the region of the insertion profile constricted in a key shape is not necessary, since in the event of a crash, and with a corresponding load on the flexible planar structure, the pull-out profile is positively pushed toward the front into the anchored position.

In certain preferred embodiments of the invention, each vehicle-mounted retainer has, at a distance below the insertion profile, a receptacle panel, equipped with a passage matched to the outer contour (viewed in the insertion direction) of the retaining element, that is mounted displaceably in the longitudinal direction of the vehicle parallel to the insertion profile and thus approximately parallel to the headliner region. This creates a concealed arrangement of the insertion profile for each retaining element that actually serves to secure the retaining element, making possible a visually attractive, largely smooth-surfaced headliner region.

In certain preferred embodiments of the invention, the receptacle panel is mounted displaceably by way of a slide guide. This is a particularly simple and functionally reliable configuration.

In certain preferred embodiments of the invention, the slide guide has two guide profiles, parallel to one another and positioned immovably on the vehicle above the insertion profile, on which guide arms that are joined integrally to the receptacle panel are mounted in slidingly movable fashion. This configuration creates stable retention and support for the receptacle panel. The integral conformation of the guide arms and receptacle panels allows production as a single unit made of plastic.

Other objects, advantages and novel features of the present invention will become apparent from the following detailed description of the invention when considered in conjunction with the accompanying drawings.

DETAILED DESCRIPTION OF THE DRAWINGS

Figure 1:
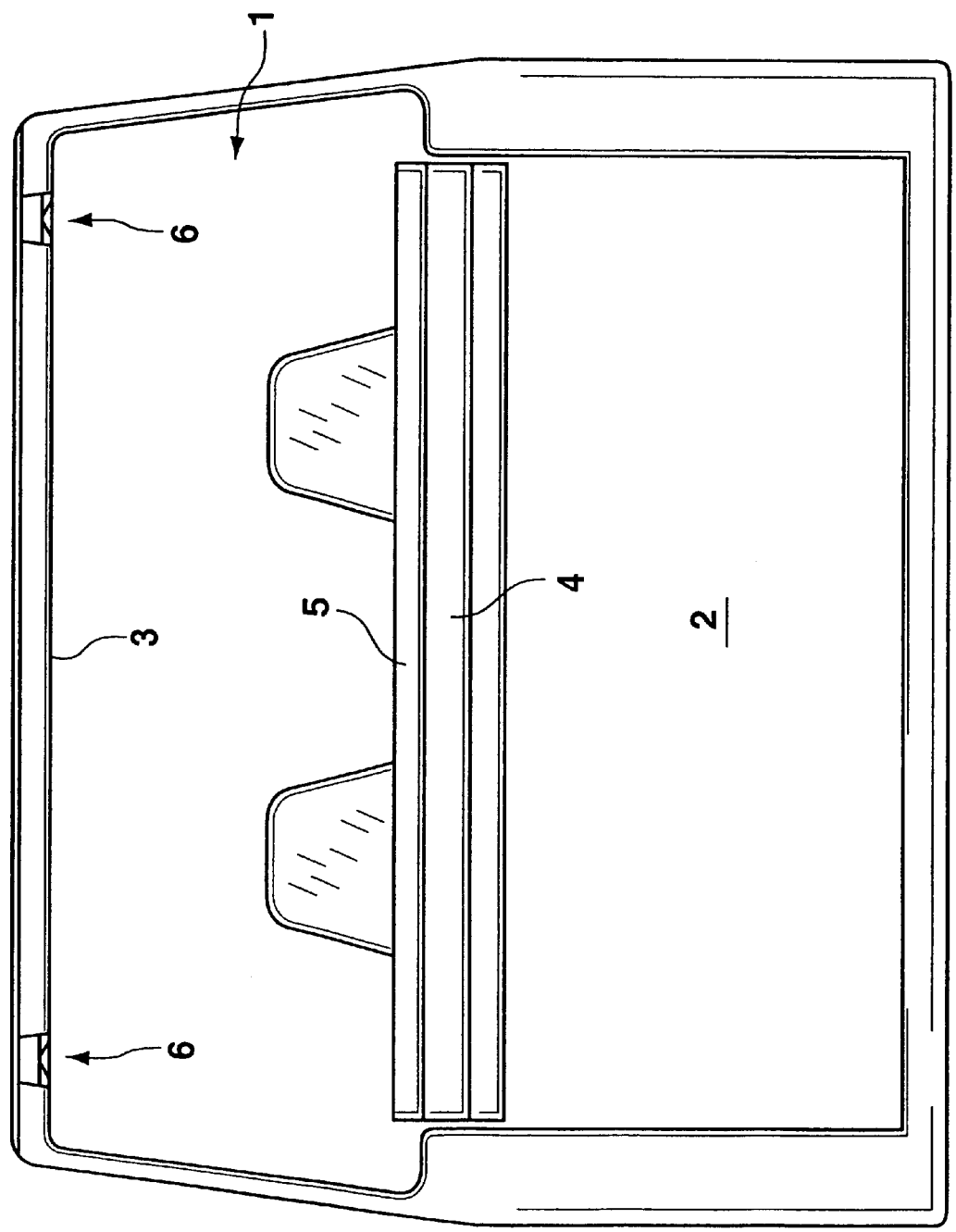
FIG. 1 schematically shows, in a view from behind, an embodiment of a cargo area divider according to the present invention in its stored rest position, in an interior of a motor vehicle behind a rear seat arrangement.
Figure 2:
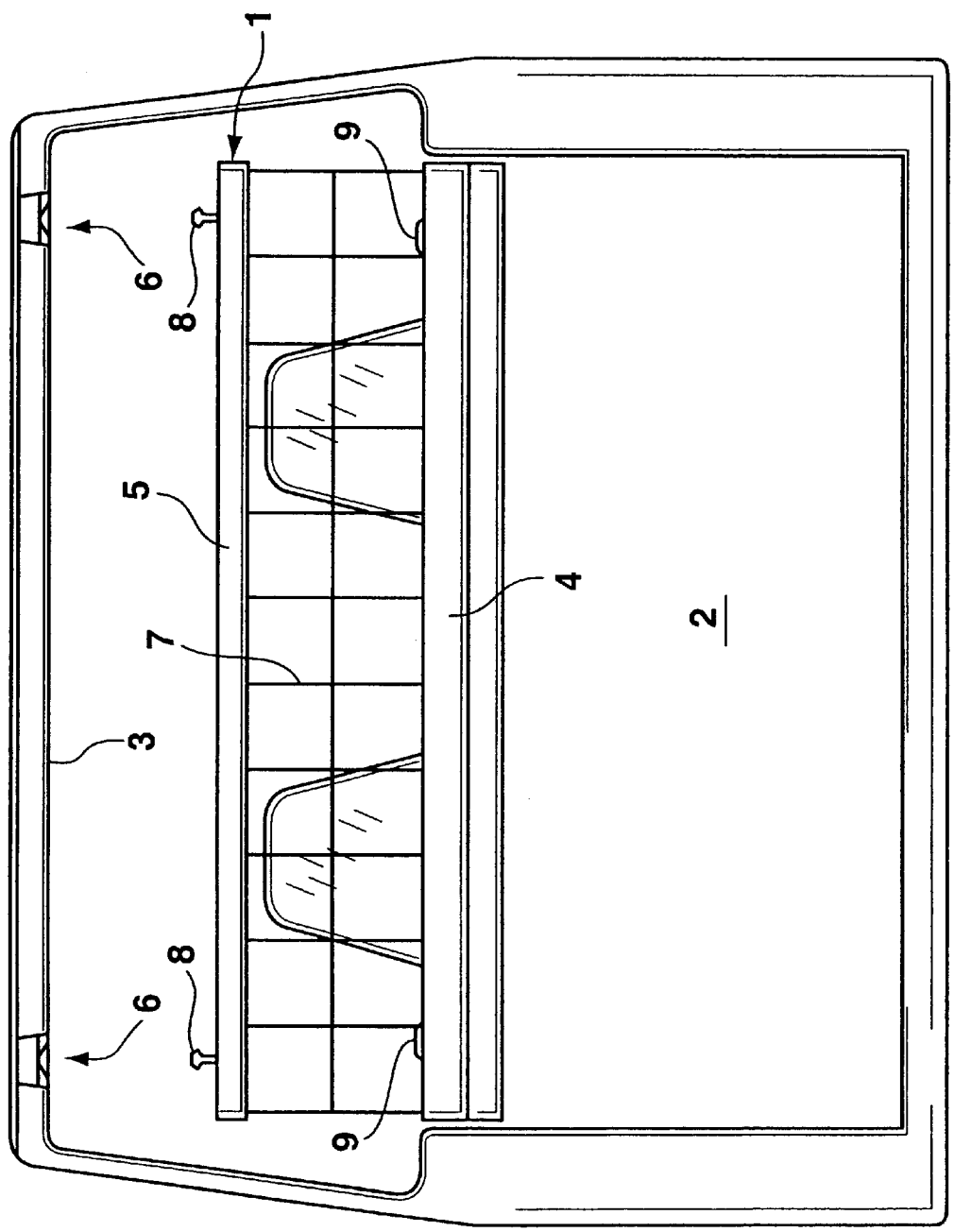
FIG. 2 shows the cargo area divider of FIG. 1 with the flexible planar structure in a partially pulled-out state.
Figure 3:
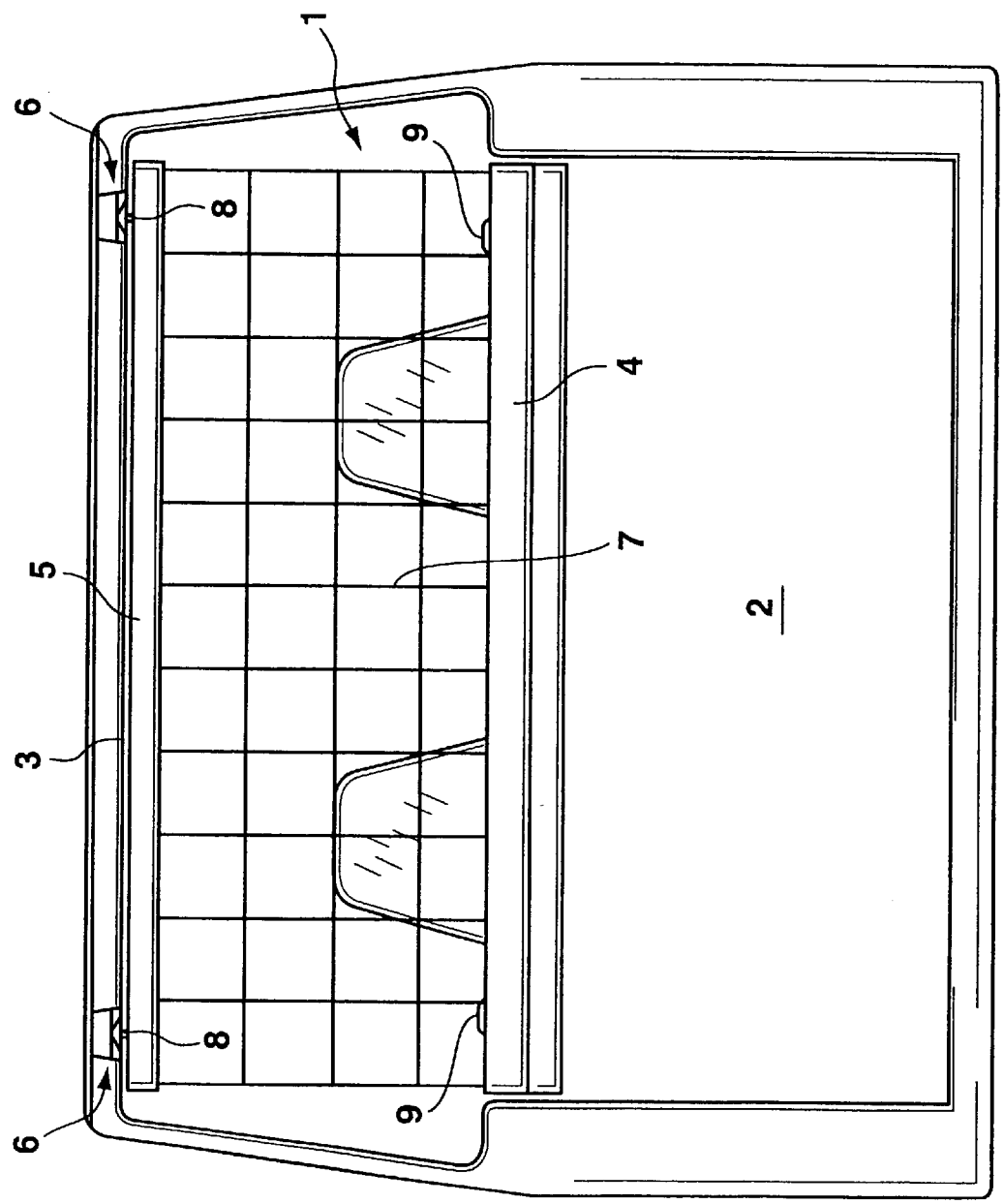
FIG. 3 shows the cargo area divider of FIGS. 1 and 2 with the flexible planar structure in the pulled-out functional state.

A cargo area divider as shown in FIGS. 1 through 6 and 8, 9 has, in a fundamentally known manner, a cassette housing 4 that is positioned immovably on the vehicle in a vehicle interior 1 on a rear side of a seatback arrangement of a rear seat arrangement 2. Vehicle interior 1 can be divided by cargo area divider 4, 5, 7, over the entire height of passenger compartment 1, into a passenger compartment or a cargo area. The cargo area divider has a divider net 7, serving as a flexible planar structure, that is held so as to wind onto and off from a roller-shade shaft mounted in cassette housing 4. In a front end region, divider net 7 is joined to a dimensionally stable pull-out profile 5 that extends transversely over the entire width of divider net 7. Pull-out profile 5 is equipped with two retaining elements 8, spaced apart from one another, that in their functional position (FIGS. 2 and 3) project out vertically upward from an upper edge of pull-out profile 5. When divider net 7 is in the pulled-out functional state (FIG. 3), the two retaining elements 8 engage respectively into vehicle-mounted retainers 6 that are arranged in a horizontal headliner region 3 of the vehicle roof. Retainers 6 are joined, above a headliner of headliner region 3, to corresponding body parts of the roof region of the motor vehicle. An underside of retainers 6 (which are described hereinafter in more detail) terminates approximately flush with the headliner of headliner region 3, so that retainers 6 are arranged in recessed fashion behind the headliner.

Figure 4:
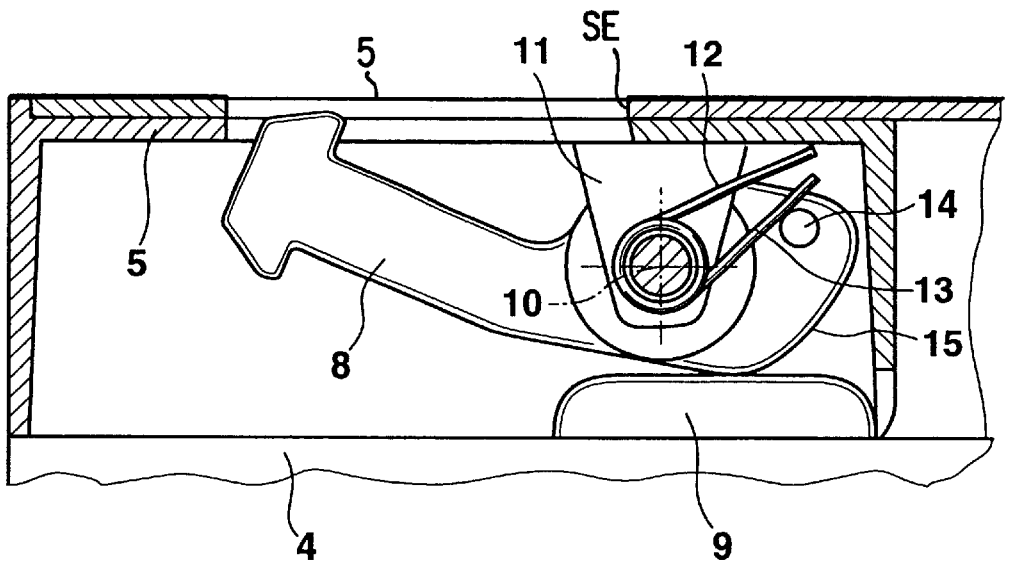
FIG. 4 shows, in an enlarged longitudinally sectioned representation, a portion of the cargo area divider at the level of a pull-out profile that is in its stored position.
Figure 5:
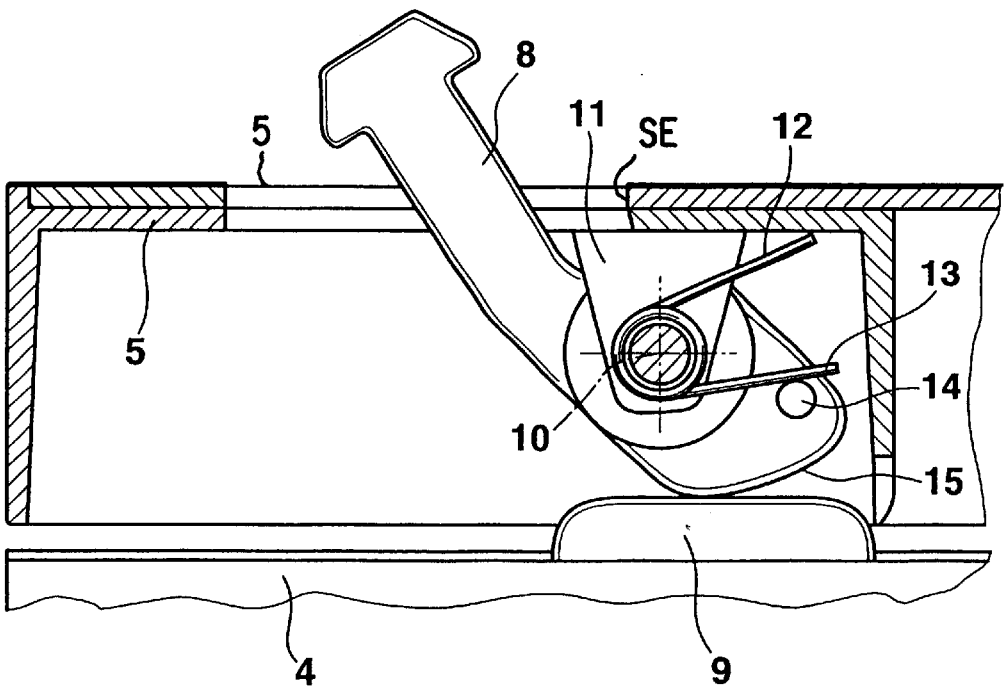
FIG. 5 shows the portion shown in FIG. 4, the pull-out profile being in an intermediate position pulled slightly upward.
Figure 6:
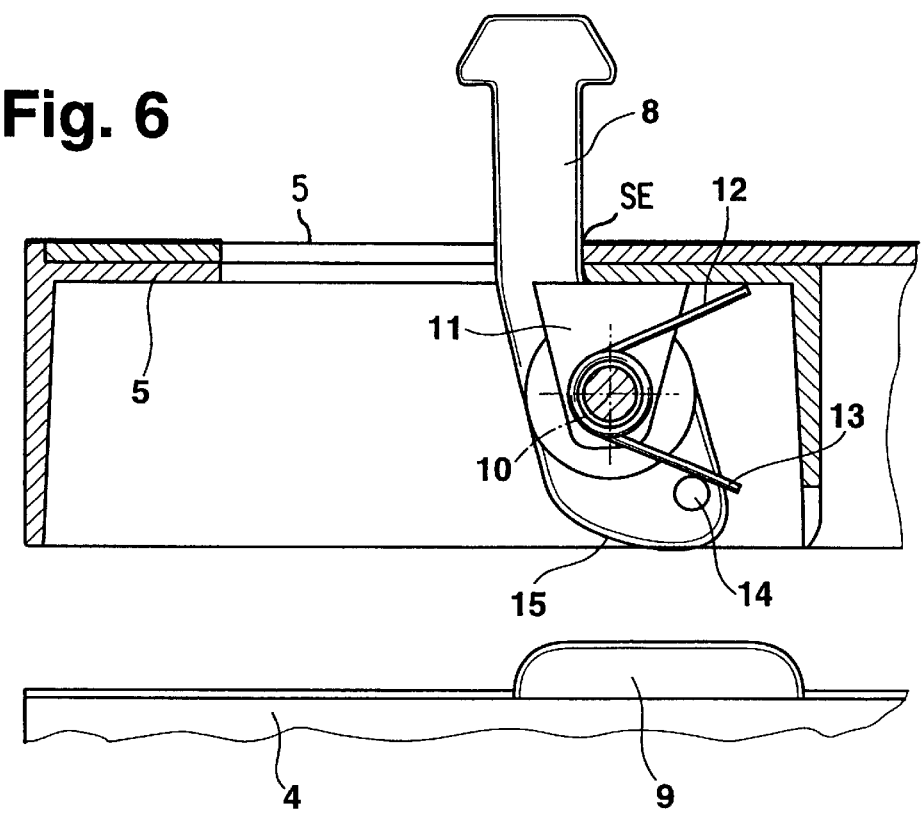
FIG. 6 shows the cargo area divider of FIGS. 4 and 5 in a further intermediate position in which a retaining element is pivoted into its functional position.

The pull-out profile is configured, at least in the region of the arrangement of the two retaining elements 8, i.e. in the opposite lateral regions, as a hollow profile that is locally open toward the bottom. Each retaining element 8 is mounted in pull-out profile 5 in pivotably movable fashion about a horizontal pivot axis 10 aligned in the longitudinal direction of the vehicle, so that retaining element 8 is pivotably movable approximately in a vertical transverse plane of the vehicle. Provided along this plane in the upper side of pull-out profile 5 is an exit slot S through which retaining element 8 can pass outward out of the recessed rest position (FIG. 4) into the elevated functional position (FIG. 6). In the elevated functional position, retaining element 8 comes to a stop against a lateral stop edge SE of the exit slot S (FIGS. 4 through 6). Each retaining element 8 is spring-loaded in the outwardly pivoting direction by a leg spring 12, 13 arranged coaxially with pivot axis 10, a first spring limb 12 bracing against an inner surface of the upper side of pull-out profile 5, and a second spring limb 13 bracing against a support stud 14 shaped integrally onto retaining element 8.

In order to cause retaining element 8 to be recessed as a function of a movement of pull-out profile into the stored position of pull-out profile 5, and to cause automatic elevation of retaining element 8 as pull-out profile 5 begins to be pulled upward out of the stored position, FIGS. 4 through 6 show that there is associated with retaining element 8 a positive guidance device 9, 15 that is constituted on the one hand by a guide contour 15 provided on a lower side of retaining element 8 and by a stop surface 9 arranged on an upper side of cassette housing 4. Guide contour 15 extends, relative to pivot axis 10 of retaining element 8 and relative to the direction of motion of pull-out profile 5, in a manner that is inclined and curved in such a way that when a lowering motion of pull-out profile 5 occurs and guide contour 15 encounters stop surface 9, a torque is exerted on retaining element 8 in the direction of the rest position of retaining element 8. Because of the corresponding configuration of guide contour 15, retaining element 8 is transferred completely into the recessed rest position as shown in FIG. 4 by the time the stored position of pull-out profile 5 is reached. When pull-out profile 5 is again pulled out upward, guide contour 15 and stop surface 9 of cassette housing 4 positioned immovably on the vehicle are no longer in contact, so that leg spring 12, 13 automatically elevates retaining element 8 into the functional position.

Figure 8:
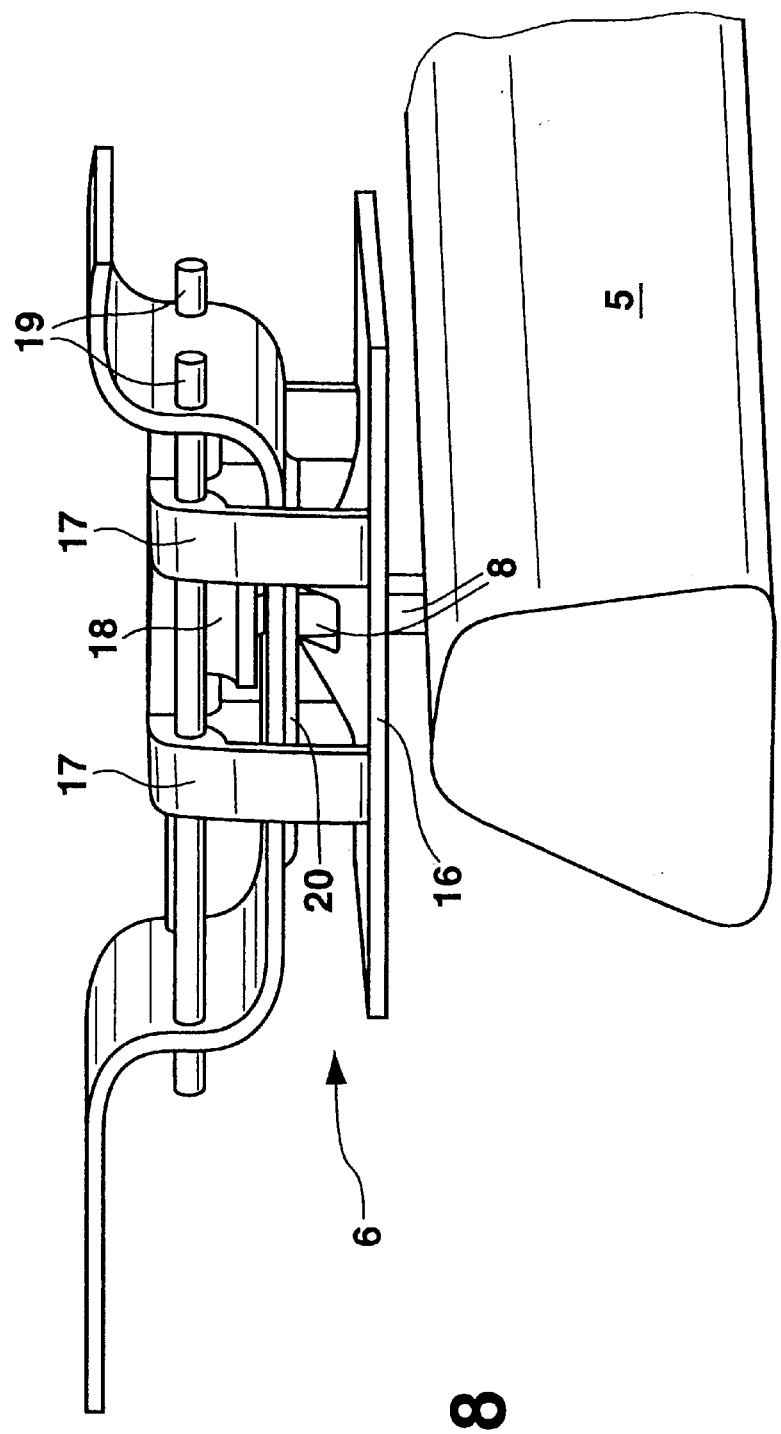
FIG. 8 shows, in a perspective representation, the cargo area divider of FIGS. 1 through 6 in the region of a vehicle-mounted retainer into which the pull-out profile is inserted by way of a retaining element.
Figure 9:
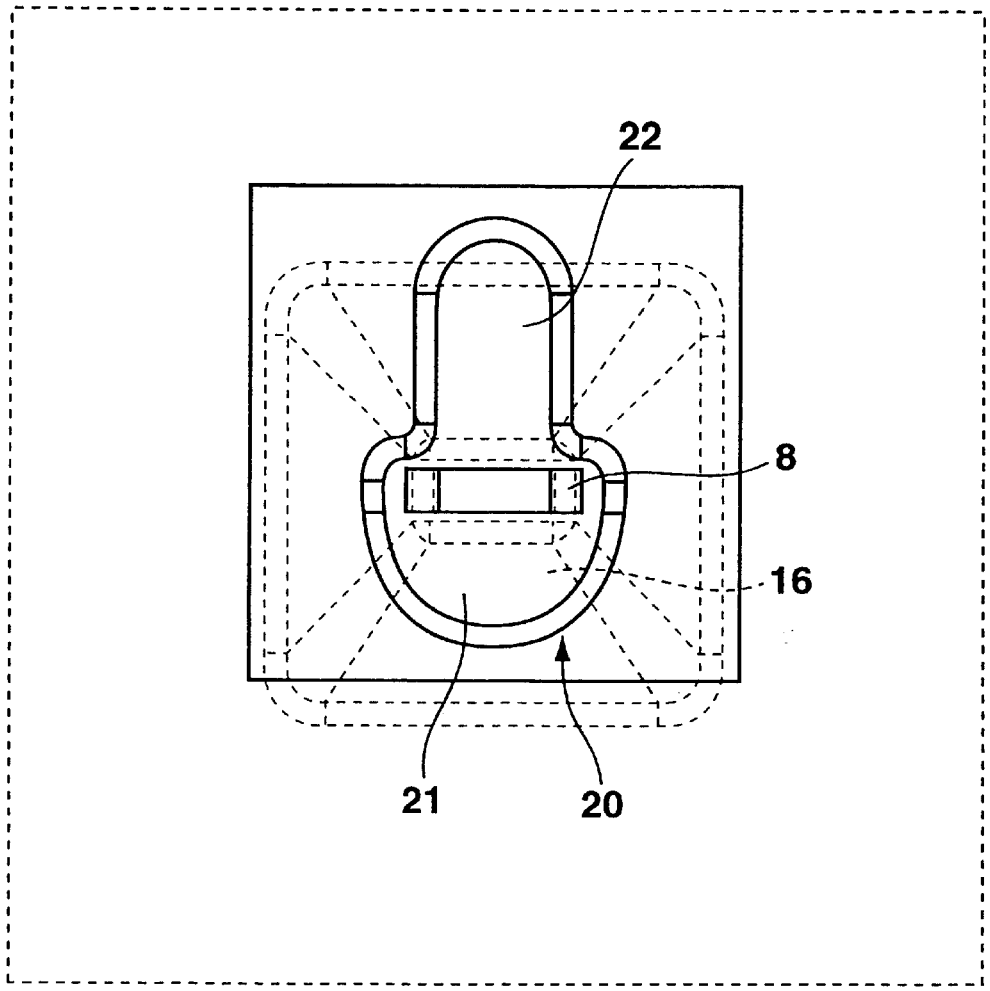
FIG. 9 shows a plan view of an insertion profile of the vehicle-mounted retainer shown in FIG. 8, with the retaining element slid in from below.

Each vehicle-mounted retainer 6 is equipped, immediately above the headliner, with a plate-like receptacle panel 16 that, in its middle region, bulges upward in funnel-like fashion (FIGS. 8, 9). The region of receptacle panel 16 that bulges in funnel-like fashion is equipped with a slot-shaped passage whose dimensions are slightly greater than the outer contour of the hammer-like head of retaining element 8, when viewed in a plan view in the insertion direction as shown in FIG. 9. The funnel-shaped bulge constitutes a centering aid for inserting the hammer-like head of the respective retaining element 8. Receptacle panel 16 is mounted, directly behind the headliner, displaceably in parallel fashion in the longitudinal direction of the vehicle. For that purpose, there are provided in a dimensionally stable, shackle-like support portion of mount 6, which is secured to a corresponding body element of the roof region, two guide profiles 19 in the form of round bars, aligned in the longitudinal direction of the vehicle and spaced apart from one another, on which receptacle panel 16 is retained with the aid of four guide arms 17 that project upward and fit in slidingly movable fashion around guide profiles 19. Guide arms 17 are shaped integrally onto receptacle panel 16 and project upward from it. Extending between guide arms 17 is a socket element 18 that is configured integrally with guide arms 17 and with receptacle panel 16 and that has a receptacle region, open toward the bottom, for bracing the hammer-like head of retaining element 8 at the top.

Figure 7:
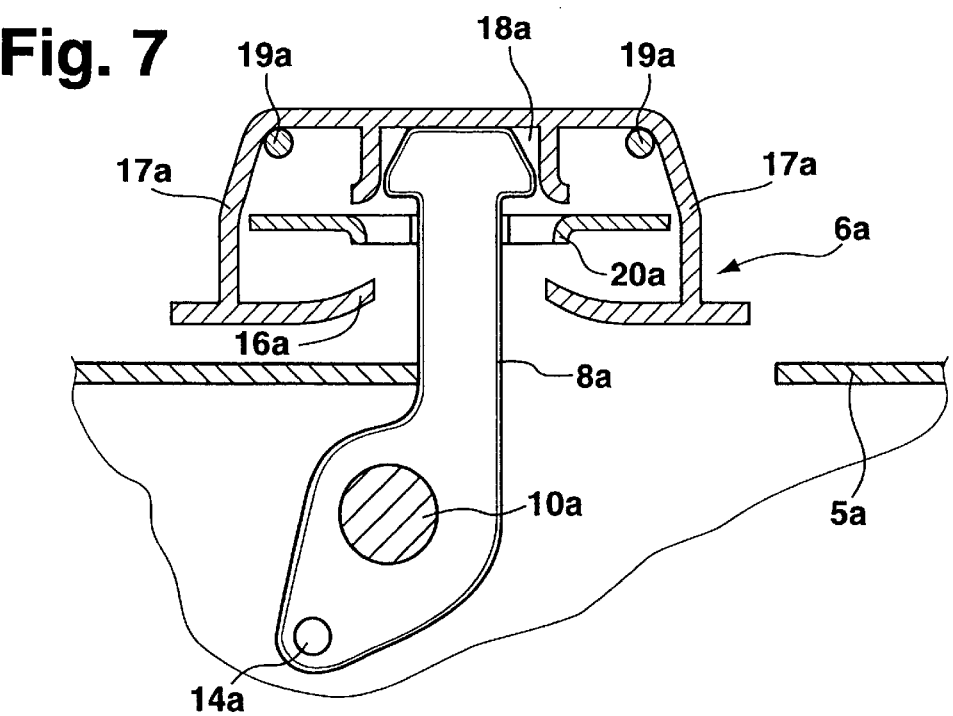
FIG. 7 shows a further embodiment of a cargo area divider according to the present invention in the region of a roof-area vehicle-mounted retainer into which a retaining element of a pull-out profile of the cargo area divider projects.

The configuration of the receptacle region of socket element 18 is evident from the similar exemplary embodiment shown in FIG. 7. Vehicle-mounted retainer 6a shown there, and retaining element 8a in pull-out profile 5a, correspond in terms of function and technical configuration to the exemplary embodiment shown in FIGS. 1 through 6, 8, and 9, only stylistic changes in the guidance of receptacle panel 16 and in the foot region of retaining element 8a being provided. In order to illustrate the functionally identical design, the same reference characters were selected for the exemplary embodiment in FIG. 7, with the simple addition of the letter "a" in each case.

The support element of retainer 6 forms, in a pass through region for retaining element 8, an insertion profile 20 that has a opening 21, 22 which is constricted in a key shape (FIG. 9). An approximately semicircular opening region 21, whose width is larger than the width of the hammer-like head of retaining element 8, is adjoined toward the front in the longitudinal direction of the vehicle by an opening region 22 that is constricted in stepped fashion and whose width is slightly larger than the width of retaining element 8 below the hammer-like head. Thus as soon as retaining element 8 has been pushed forward in the longitudinal direction of the vehicle into the constricted opening region 22, simultaneously with displacement of receptacle panel 16, it is conformingly anchored in insertion profile 20 so it cannot be pulled out. Socket element 18 is located on the side of insertion profile 20 located opposite the funnel-shaped bulge, and thus forms the end-located stop for the insertion motion of retaining element 8.

Thus in order to transfer divider net 1 into its pulled-out functional state from the rest position shown in FIG. 1, pull-out profile 5 is pulled upward, as a result of which retaining elements 8 are automatically pushed into their elevated functional position. Pull-out profile 5 is pulled or pushed upward until retaining elements 8 engage into the funnel-like bulges of receptacle panel 16 of each retainer 6 in headliner region 3. Retaining elements 8 and pull-out profile 5 are pushed farther upward until the end faces of the hammer-like heads of retaining elements 8 come to a stop in the receiving regions of socket elements 18. Pull-out profile 5 is then pushed slightly forward in the vehicle's direction of travel, thus causing retaining elements 8 to enter the constricted opening regions 22 of insertion profiles 20, and to engage with their hammer-like heads behind the edges of that opening region 22. This results in conforming anchoring in insertion profiles 20. In order for divider net 7 to be lowered again into its pulled-in rest position, and for the pull-out profile to be lowered into its stored position, pull-out profile 5 is first pulled or pushed backward with respect to the vehicle's direction of travel until retaining elements 8 are once again positioned at the level of the enlarged opening region 21 of each insertion profile 20. Pull-out profile 5 is then lowered downward so that when cassette housing 4 is reached, guide contours 15 of retaining elements 8 come into contact against stop surfaces 9 and transfer retaining elements 8 into the lowered rest position. Since the roller-shade shaft is spring-loaded in the pull-in direction of the divider net, the return motion of divider net 7 and the corresponding lowering motion of pull-out profile 5 into the stored position occur with the assistance of spring force from the corresponding spring arrangement of the roller-shade shaft.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cargo area divider for a motor vehicle, having at least one flexible planar structure, arranged so it can wind onto and off from a roller-shade shaft mounted in a vehicle-fixed bearing, that is equipped in a front end region with a dimensionally stable pull-out profile, extending over the entire width of the planar structure, that has retaining elements for detachably securing the pull-out profile, on vehicle-mounted retainers in a roof region of the motor vehicle when the planar structure is in the pulled-out functional state, wherein, when the planar structure is in the pulled-out functional state, the retaining elements project upward beyond an upper edge of the pull-out profile; and the corresponding vehicle-mounted retainers are positioned, in order to receive the retaining elements, in a horizontal headliner region at a distance from lateral roof frame elements of the roof region of the motor vehicle, and wherein the retaining elements are mounted on the pull-out profile movably between a rest position recessed into the pull-out profile and an elevated functional position projecting upward from the pull-out profile.

2. The cargo area divider as defined in claim 1, wherein there is associated with the retaining elements a positive guidance device that has, at the level of the pulled-in stored position of the pull-out profile, positive guidance elements positioned immovably on the vehicle that force each retaining element into its recessed rest position as the stored position of the pull-out profile is reached, and release them for movement into the functional position as the pull-out profile is pulled out.

3. A cargo area divider for a motor vehicle, having at least one flexible planar structure, arranged so it can wind onto and off from a roller-shade shaft mounted in a vehicle-fixed bearing, that is equipped in a front end region with a dimensionally stable pull-out profile, extending over the entire width of the planar structure, that has retaining elements for detachably securing the pull-out profile, on vehicle-mounted retainers in a roof region of the motor vehicle when the planar structure is in the pulled-out functional state, wherein, when the planar structure is in the pulled-out functional state, the retaining elements project upward beyond an upper edge of the pull-out profile; and the corresponding vehicle-mounted retainers are positioned, in order to receive the retaining elements, in a horizontal headliner region at a distance from lateral roof frame elements of the roof region of the motor vehicle, and wherein each retaining element is spring-loaded in a direction of its functional retaining position.

4. The cargo area divider as defined in claim 2, wherein each retaining element is spring-loaded in a direction of its functional retaining position.

5. The cargo area divider as defined in claim 2, wherein each retaining element is mounted in pivotably movable fashion and has a guide contour that coacts with a stop, positioned immovably on the vehicle, in the region of the stored position of the pull-out profile.

6. The cargo area divider as defined in claim 4, wherein each retaining element is mounted in pivotably movable fashion and has a guide contour that coacts with a stop, positioned immovably on the vehicle, in the region of the stored position of the pull-out profile.

7. A cargo area divider for a motor vehicle, having at least one flexible planar structure, arranged so it can wind onto and off from a roller-shade shaft mounted in a vehicle-fixed bearing, that is equipped in a front end region with a dimensionally stable pull-out profile, extending over the entire width of the planar structure, that has retaining elements for detachably securing the pull-out profile, on vehicle-mounted retainers in a roof region of the motor vehicle when the planar structure is in the pulled-out functional state, wherein, when the planar structure is in the pulled-out functional state, the retaining elements project upward beyond an upper edge of the pull-out profile; and the corresponding vehicle-mounted retainers are positioned, in order to receive the retaining elements, in a horizontal headliner region at a distance from lateral roof frame elements of the roof region of the motor vehicle, wherein each vehicle-mounted retainer has an insertion profile that is constricted in a key shape toward the front in the vehicle travel direction, conformingly securing the retaining elements, and wherein each vehicle-mounted retainer has, at a distance below the insertion profile, a receptacle panel, equipped with a passage matched to the outer contour, viewed in the insertion direction, of the retaining element, that is mounted displaceably in the longitudinal direction of the vehicle parallel to the insertion profile and thus parallel to the headliner region.

8. The cargo area divider as defined in claim 7, wherein the receptacle panel is mounted displaceably by way of a slide guide.

9. The cargo area divider as defined in claim 8, wherein the slide guide has two guide profiles, parallel to one another and positioned immovably on the vehicle above the insertion profile, on which guide arms that are joined integrally to the receptacle panel are mounted in slidingly movable fashion.

10. The cargo area divider as defined in claim 1, wherein each vehicle-mounted retainer has an insertion profile that is constricted in a key shape toward the front in the vehicle travel direction, conformingly securing the retaining elements.

11. The cargo area divider as defined in claim 10, wherein each vehicle-mounted retainer has, at a distance below the insertion profile, a receptacle panel, equipped with a passage matched to the outer contour, viewed in the insertion direction, of the retaining element, that is mounted displaceably in the longitudinal direction of the vehicle parallel to the insertion profile and thus parallel to the headliner region.

12. The cargo area divider as defined in claim 2, wherein each vehicle-mounted retainer has an insertion profile that is constricted in a key shape toward the front in the vehicle travel direction, conformingly securing the retaining elements.

13. The cargo area divider as defined in claim 3, wherein each vehicle-mounted retainer has an insertion profile that is constricted in a key shape toward the front in the vehicle travel direction, conformingly securing the retaining elements.

14. The cargo area divider as defined in claim 6, wherein each vehicle-mounted retainer has an insertion profile that is constricted in a key shape toward the front in the vehicle travel direction, conformingly securing the retaining elements.

15. The cargo area divider as defined in claim 14, wherein each vehicle-mounted retainer has, at a distance below the insertion profile, a receptacle panel, equipped with a passage matched to the outer contour, viewed in the insertion direction, of the retaining element, that is mounted displaceably in the longitudinal direction of the vehicle parallel to the insertion profile and thus parallel to the headliner region.

16. The cargo area divider as defined in claim 15, wherein the receptacle panel is mounted displaceably by way of a slide guide.

17. The cargo area divider as defined in claim 16, wherein the slide guide has two guide profiles, parallel to one another and positioned immovably on the vehicle above the insertion profile, on which guide arms that are joined integrally to the receptacle panel are mounted in slidingly movable fashion.

* * * * *